May 26, 1925.
J. F. GORMAN
TREE FELLING ATTACHMENT FOR PORTABLE SAWS
Filed Aug. 11, 1921
1,538,983
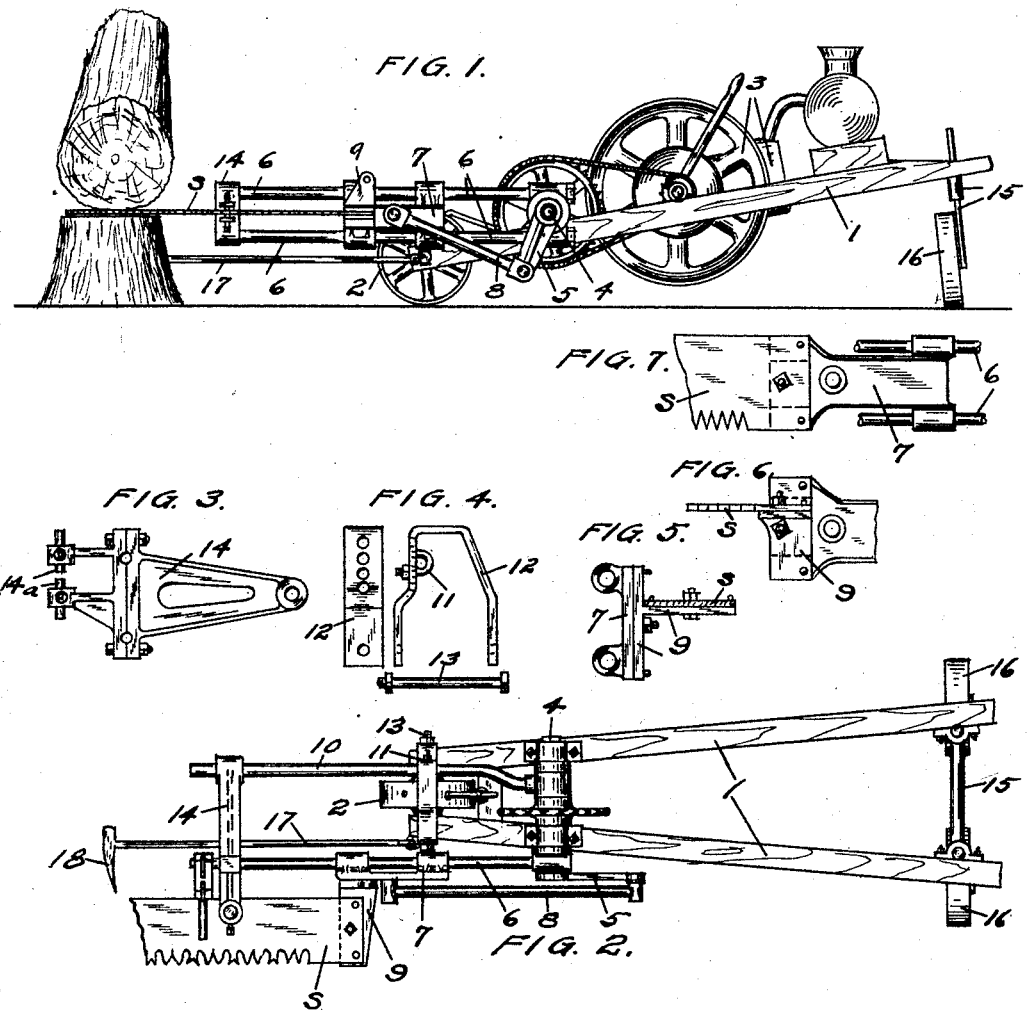

Patented May 26, 1925.

1,538,983

UNITED STATES PATENT OFFICE.

JOHN F. GORMAN, OF SAN FRANCISCO, CALIFORNIA.

TREE-FELLING ATTACHMENT FOR PORTABLE SAWS.

Application filed August 11, 1921. Serial No. 491,562.

*To all whom it may concern:*

Be it known that I, JOHN F. GORMAN, a citizen of the United States, residing in the city and county of San Francisco, California, have invented certain new and useful Improvements in Tree-Felling Attachments for Portable Saws, of which the following is a specification.

This invention relates to certain improvements in my invention in portable power saws, as shown and described in my U. S. Patent No. 1,323,465, issued Dec. 2, 1919, whereby said saw can be converted into a power saw for felling trees, thus increasing its field of usefulness with a comparatively small additional expense.

In order to explain my invention, I have shown it in the accompanying drawings, which I will now explain.

Figure 1 is a side elevation of a drag saw embodying my invention;

Figure 2 is a top plan view thereof, with parts omitted;

Figures 3, 4, 5, 6 and 7 are details.

In my portable power saw above referred to, the saw projects alongside of the frame members, the handled ends of said frame members resting on the log to be sawed and being anchored thereto, while the saw is operated in a vertical plane through said log.

In converting my said power saw into a tree felling machine, the saw carrying and operating members are swung over and project in the opposite direction, or beyond the carrying wheel or ground end of the saw frame, as will be clear from the following description, taken with the accompanying drawings.

In the drawings, the frame 1, the carrying wheel, 2, the engine 3, and the drive shaft 4, with its crank arm 5, are the same as in the portable power saw referred to, as are also the guide rods, 6, and the sliding head, 7, moving thereon and connected with the crank arm 5, by means of a pitman rod or arm, 8.

These parts are all capable of turning on the power shaft 4, and of being swung over from one side of said shaft to the other side thereof. In the portable power saw in which the saw is attached to operate in a vertical plane, the saw is attached to the head 7, as indicated in Fig. 7, the saw being indicated or designated S.

In order to use the device as a tree felling machine, I provide an angle attachment for the head. This is designated 9, and is shown in Figs. 5 and 6, and also in the main Figures 1 and 2, and is secured to the regular head, 7, as indicated, the saw S being secured thereto in a horizontal plane, as shown.

A brace rod, 10, with bearing on the shaft 4, is provided, and this projects forwardly of the machine, as shown, and is supported intermediate its ends by means of a J-bolt, 11, in a wheel bracket, 12, the lower ends of which receive the wheel bolt, 13. Mounted on the guide rods, 6, and on said brace rod 10, is a saw supporting bracket 14, shown in side elevation in Fig. 3, the saw being positioned between the spaced studs, 14ª, adjustably held in the arms of said bracket 14.

The handled end of the saw frame is also provided with a wheel frame, 15, provided with two wheels, 16, 16, set transversely of the frame, as shown, whereby the frame can be moved laterally in either direction, and by this means the saw is moved or fed into the tree being cut, the frame being turned about the supporting wheel, 2, which becomes the fulcrum. An anchor rod, 17, with prong 18, is attached to the forward end of the frame, for anchoring the machine to the tree to be felled.

With the attachments thus put in place, my portable power saw can be converted into a tree felling machine with the saw positioned to be operated in a horizontal plane by the same power mechanism, and while many changes can be made in the details of my invention, as here shown for illustrative purposes, I do not limit the invention, except as I may be limited by the hereto appended claims.

I claim:

1. A tree felling mechanism comprising a portable frame, a support at one end of said frame to act as a fulcrum, the said frame having a ground wheel support at the other end to permit its lateral movement, saw operating mechanism on said frame, and means for attaching and holding a saw blade operatively in a horizontal plane and projecting forwardly from said frame, whereby the movement of said frame laterally at one end operates to feed said saw laterally in a horizontal plane, substantially as described.

2. In combination, a supporting frame, a supporting member at one end to act as a fulcrum, a ground wheel support for the opposite end to permit said frame to move laterally, an engine on said frame, a saw driving head connected to be driven by said engine, means for attaching a saw to said head in a horizontal plane, said saw projecting forwardly from said frame and positioned to be fed into the work in a horizontal plane as said frame is moved laterally at the opposite end by pivoting at the said supporting end, and supporting means for supporting the saw blade intermediate its ends, substantially as described.

3. In combination, an A-frame with a supporting wheel at its small end and a ground wheel support at its outer end turned so that said end may be moved laterally in opposite directions, an engine on said frame, a saw-operating head driven by said engine, means for attaching a saw to said head in a horizontal plane, said saw projecting forwardly from the small end of said frame, whereby as said frame is moved laterally at the large end by pivoting at its small end, said saw is moved laterally into the work at the opposite end, and means for guiding the saw during its operation, substantially as described.

Signed at San Francisco, California, this 12 day of July, 1921.

JOHN F. GORMAN.

In presence of—
P. B. MacLane,
N. E. W. Smith.